April 18, 1933.                T. B. CLARK                1,903,958
                              WATER SOFTENER
                            Filed May 7, 1928           2 Sheets-Sheet 1

Inventor:
Thomas B. Clark
By Wilson & McCanna
       Attys.

April 18, 1933.   T. B. CLARK   1,903,958
WATER SOFTENER
Filed May 7, 1928    2 Sheets-Sheet 2

Inventor:
Thomas B. Clark
By
Wilson & McCanna
Attys.

Patented Apr. 18, 1933

1,903,958

UNITED STATES PATENT OFFICE

THOMAS B. CLARK, OF ROCKFORD, ILLINOIS, ASSIGNOR, BY MESNE ASSIGNMENTS, TO THE PERMUTIT COMPANY, OF WILMINGTON, DELAWARE, A CORPORATION OF DELAWARE

WATER SOFTENER

Application filed May 7, 1928. Serial No. 275,801.

This invention relates to base-exchange water softeners and is more particularly concerned with a double tank softener affording double or two-way flow of the water therethrough.

The principal object of the present invention is to provide a softener of the character described enabling the use of very fine zeolite minerals which are otherwise unsuited for use in softeners, the finer mineral being of advantage in that it makes for increased softening capacity and quicker softening and regeneration action, and is, moreover, much less expensive than the coarser minerals. An important feature lies also in the fact that the softener of the present invention does not require the use of fine retaining screens to prevent the loss of the mineral, such strainers being objectionable because they involved pressure loss when softening at high rates of flow and were always apt to become clogged. In a softener operating in accordance with my invention the zeolite in one tank serves as a trap or retainer for the light zeolite which tends to be entrained in the upflow of water through the other tank, so that there can be no loss of zeolite, and, furthermore, the zeolite in both tanks is repeatedly graded or classified in the successive reversals in direction of flow of water through the softener such that the coarsest zeolite is caused to remain nearest the outlet, thus insuring minimum restriction to flow.

Still another important object of the invention is to provide a softener permitting of counter-current salting with a one step regeneration, that is, without having to reverse the flow during regeneration. This is of importance in that it means regeneration of the softener with a minimum amount of water and also in the shortest length of time.

The invention is more fully described in the following specification in which reference is made to the accompanying drawings, wherein—

The same reference numerals are applied to corresponding parts throughout the views.

Figure 1:
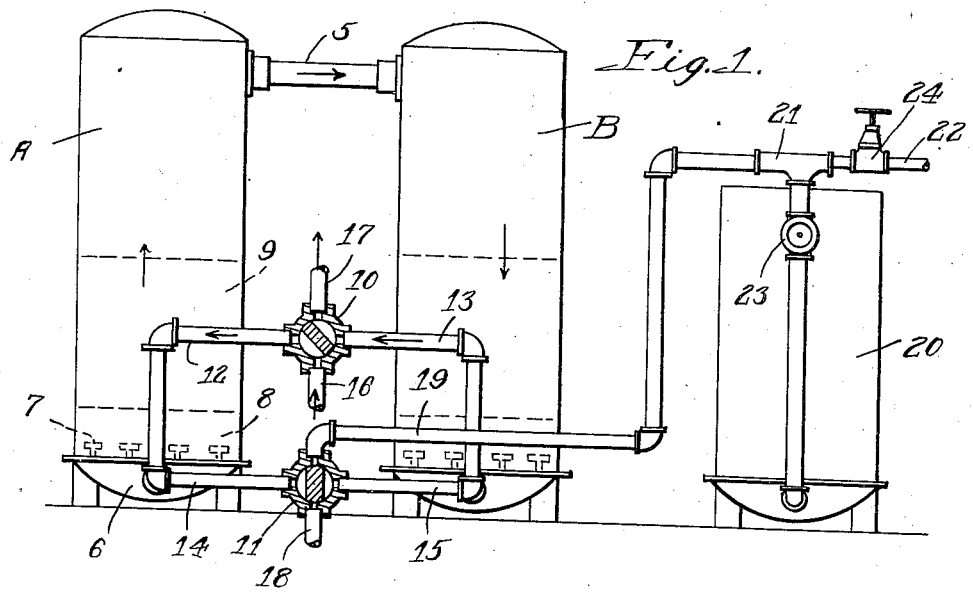
Figure 1 is a view of a double tank softener made in accordance with my invention shown in connection with a brine tank required in the installation thereof. The arrows indicate the direction of flow for softening.

Referring for the present to Fig. 1, the softener comprises the two tanks A and B connected together at the top by a fairly large pipe 5. Each of said tanks has a hollow bottom 6 supporting a distributor plate having strainer nozzles 7 thereon for the inlet or outlet of water as the case may be. Any form of water distributing means designed for use on up or downflow softeners will serve the present purpose. Over each distributor plate is a bed of graded gravel or quartz of the proper depth, indicated at 8, and filled in above this is a bed of fine zeolite mineral 9. The two tanks together have enough zeolite in them approximately sufficient to fill one tank completely, that is to say, about up to the pipe connection 5. While the softener of my invention has been designed with a special view to the use of very fine zeolite minerals it should be understood, however, that it is not limited to operation therewith but is also adaptable to coarser minerals with screen analysis running 8—30, 10—40, 10—20, 20—40, 30—50, etc. Two four-way valves 10 and 11 are connected with the bottoms 6 of the tanks A and B, the former through pipes 12 and 13, respectively, and the latter through pipes 14 and 15, respectively. The other two connections for the valve 10 are indicated at 16 and 17, the pipe 16 leading from the source of hard water supply, as for example the city mains, and the pipe 17 leading to the service system which is to be supplied with soft water. The other two connections for the valve 11 are indicated at 18 and 19, the pipe 18 leading to the sewer, or other drain receptacle, and the pipe 19 leading to the brine tank 20. The latter may be of any suitable or preferred form, there being many types available in connection with which an injector such as that shown at 21 may be used, the brine being entrained at the injector with the hard water supplied through the pipe 22. A valve 23 serves to control the flow of brine from the tank 20 into the injector 21 and a valve 24 controls the flow of water from the pipe 22. Obviously, the pipes 16 and 22 may have connection with the same main or other source of hard water supply.

When the tanks are initially filled with zeolite, enough of the mineral to fill one tank completely, as stated before, is divided evenly between the two tanks. Valve 10 is turned to direct the incoming hard water from the pipe 16 first into one tank, say tank A, and valve 11 is turned to the position shown in Fig. 4 to connect the other tank, tank B, to the drain 18. The valves 23 and 24 are left closed. The passage of water up through tank A and down through tank B causes the zeolite in tank A to be classified or graded so that the heaviest and largest grains are left at the bottom and the finest and lightest are brought to the top. The zeolite will be gradually graded from coarse to fine by the flow of the water and some of the finest zeolite will be carried over into tank B. Then, valves 10 and 11 are reversed to cause the water to flow up through tank B and down through tank A so as correspondingly to classify or grade the zeolite in tank B. The softener is then in condition for service. It will be noted that this preliminary step brings the coarsest zeolite nearest the outlet regardless of whether the outlet be at the bottom of the tank A or at the bottom of tank B, which, of course, is determined by the direction of flow of the water through the softener. The advantages derived will now be described. It has been found that when a screened outlet is employed above a zeolite bed through which the water flows upwardly that the zeolite classifies so that the finest grains are brought up directly against the outlet screen. This, for obvious reasons, causes a material restriction to the flow of the water and consequently an excessive pressure loss, especially at high rates of flow. The type of screen makes very little difference in this effect because the fine grains lying against the outlet screen leave very few voids and there is, therefore, a more or less uniform impervious layer through which the water has considerable difficulty in passing; the area of water passage is, in other words, materially restricted. It has been found on the other hand that if it is possible to get a relatively coarse zeolite to lie against the outlet screen that the restriction to flow is easily within the allowable limit for satisfactory operation, this being for the reason that the coarser zeolite has a higher percentage of voids and correspondingly allows freer passage of the water therethrough. The fine zeolite in such a case is not disposed in a uniform and impervious layer but is more or less dispersed amongst the coarser zeolite, which means that there will be no appreciable restriction to flow. It will be seen that a softener made and operated in accordance with my invention obtains the signal advantage of keeping the coarser zeolite nearest the outlet. Once the zeolite has been graded or classified, as I have described above, the coarsest material is left nearest the outlet regardless of whether the water flows up in A and down in B or vice versa, and, of course, upon each reversal in direction of flow the zeolite in the up-flow tank is reclassified so that this condition is maintained throughout the operation of the softener. It is also evident that regardless of which direction the water is flowing, the tank through which the water passes downwardly serves as a trap or retainer for the lightest zeolite carried up in the upflow of water in the other tank.

Figure 2:
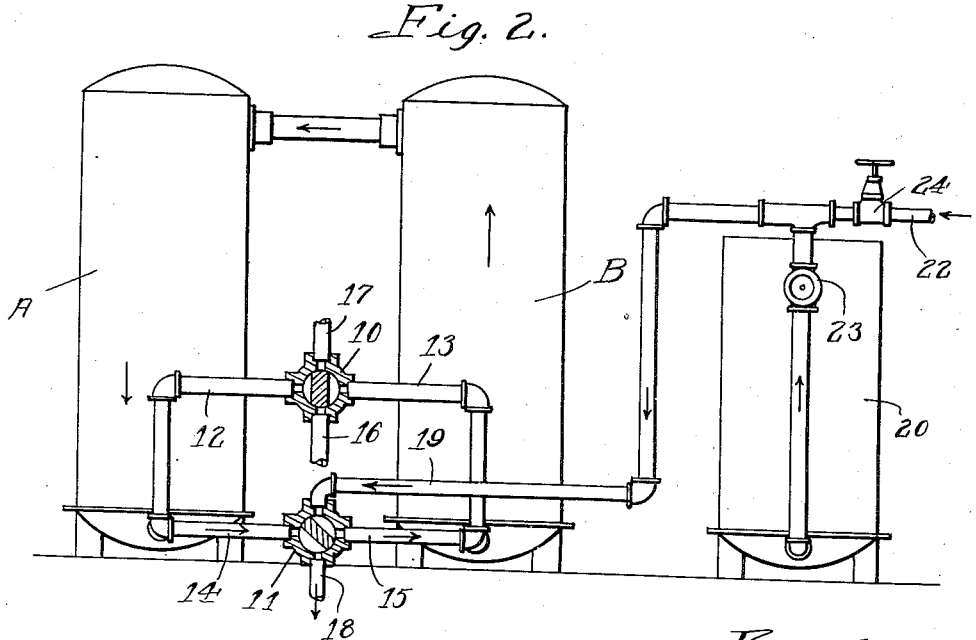
Fig. 2 is a similar view showing the valves shifted for regeneration, the direction of flow for regeneration being also indicated by arrows.
Figure 3:
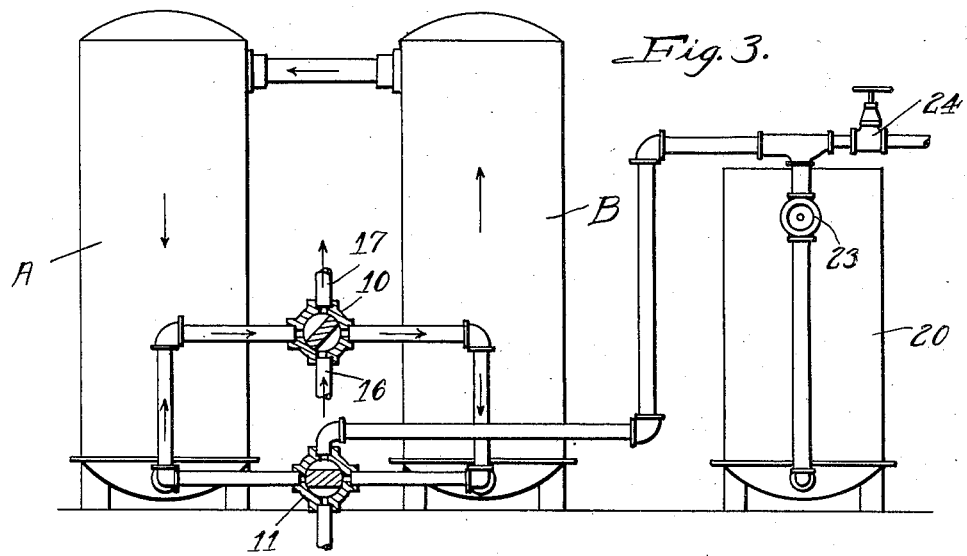
Fig. 3 is a view similar to Fig. 1 showing the valves shifted from the positions shown in Fig. 2 to their other softening positions.
Figure 4:
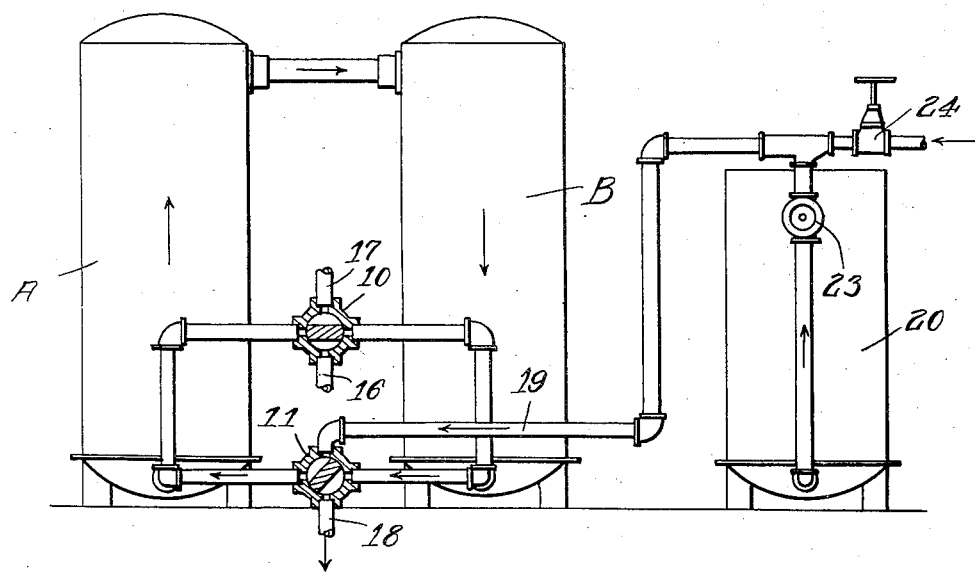
Fig. 4 is a view similar to Fig. 2 showing the valves shifted from the positions shown in Fig. 3 to their other regeneration positions.

The cycle of operation will now be described by reference to Figs. 1 and 2, referring to Fig. 1 for the softening operation and Fig. 2 for the regeneration. In softening operation, the valve 10 is shifted to the position shown and the valve 11 is closed as shown, the valves 23 and 24 being left closed. This produces the following flow as indicated by the arrows in Fig. 1: From pipe 16 through pipe 12 into the bottom of tank A; then upwardly through tank A and through pipe connection 5 and downwardly through tank B; then out of the bottom of tank B through pipe 13 to the service pipe 17. The softening operation is continued until the capacity of the plant has been exhausted, or nearly so, when the same is arranged to be regenerated by shifting the valve 10 to closed position and the valve 11 to the open position shown in Fig. 2. Valves 23 and 24 are opened so that brine is drawn from the tank 20 and takes the following course: Through valve 11 and pipe 15 into the bottom of tank B; then upwardly through tank B and downwardly through tank A, and then through pipe 14 and valve 11 to the drain 18. It will be observed that this is counter-current salting since the flow is in the opposite direction to the flow of the water in the previous service run. When the proper amount of brine has been passed through the softener the valve 23 is closed and fresh hard water from the pipe 22 is allowed to continue to flow through the softener to wash out the brine residue to the drain. If desired, a test bib may be provided at the drain to permit withdrawing samples of the water to test the same, and when the water tests soft the regeneration is known to be complete. Then the valve 24 may be closed and the valves 10 and 11 shifted to the positions shown in Fig. 3, the valve 11 in that case being closed. It is hardly necessary to trace the course of the water from the hard water pipe 16 through the softener to the service pipe 17, the same being indicated by arrows. It will be observed that the flow is in the same direction as in the previous regeneration just described. In other words, the softener of the present invention does not require reversal of flow in regeneration as is necessary with counter-current salting in the ordinary type of softener; the present invention provides one-step regeneration. In the ordinary softener a reversal of flow in regeneration is objectionable for the reasons that it is either necessary to drain the plant or wash out the hard water from above the bed to the drain, all of which means both a waste of time and a waste of water for regeneration, both of which factors are reduced to a minimum in the regeneration of the softener of my invention. When the capacity of the softener has been exhausted in operating as shown in Fig. 3 the valves 10 and 11 are arranged to be shifted, as shown in Fig. 4, so that the valve 10 is closed and the valve 11 is opened, establishing communication between the brine pipe 19 and the lower end of the tank A and between the lower end of the tank B and the drain 18. When the valves 23 and 24 are opened it is evident from the arrows what course is taken by the brine in passing through the softener. After the proper amount of brine has been passed through the softener the valve 23 is closed as previously described and the softener is flushed out with fresh hard water until the water tests soft at the drain 18 whereupon the valve 24 is closed and the valves 10 and 11 are shifted to the positions shown in Fig. 1. The softener in each cycle of operations goes through two softening periods and is regenerated twice, as will appear from the foregoing description.

It is believed the foregoing description conveys a clear understanding of the principles of operation of the softener of my invention. It should be understood that while reference has been made to the use of very fine zeolite minerals, the invention should not be regarded as limited in that respect, inasmuch as medium or coarse grained mineral might be employed and substantially the same advantages derived. The appended claims have been drawn with a view to covering all legitimate modifications and adaptations of the invention.

I claim:

1. A water softener comprising in combination a pair of tanks connected together at the top, each of said tanks containing a bed of water softening material, water distributing means in the bottom of each of said tanks, and a pair of four-way valves, each of which has two ports connected with the bottoms of said tanks, there being a source of hard water supply connected with one of the remaining ports of one of said valves and a pipe leading to a service system connected with the other port thereof, and there being a source of brine and flush water connected with one of the two remaining ports of the other valve and a pipe leading to a drain connected to the other port thereof.

2. A softener as set forth in claim 1 wherein the source of supply of brine and flush water has a brine valve and a flush water valve, both of which are arranged to be opened during the salt wash and the former of which is arranged to be closed during the subsequent flushing.

3. A water softener, comprising in combination, a pair of tanks connected together at the top, each of said tanks containing a bed of water softening material, water distributing means in the bottom of each of said tanks, a four-way valve having two ports thereof connected with the bottoms of said tanks and having a source of hard water supply connected with one of the remaining ports and a pipe leading to a service system connected to the other port thereof, whereby to permit the inlet of hard water interchangeably to either tank and the withdrawal of soft water from the other tank, and other valve mechanism also having ports connected with the bottoms of said tanks and having two other ports to one of which a source of brine and flush water is connected, and to the other of which a pipe leading to a drain is connected.

4. A softener as set forth in claim 3, wherein the source of supply of brine and flush water has a brine valve and a flush water valve, both of which are arranged to be opened during the salt wash, and the former of which is arranged to be closed during the subsequent flushing.

5. A softener as set forth in claim 1, wherein the source of supply of brine and flush water has a brine valve and a flush water valve and includes an injector having the brine connection thereof with the brine valve and the water connection with the flushing valve, both of said valves being arranged to be opened during the salt wash, and the brine valve being arranged to be closed during the subsequent flushing.

6. A softener as set forth in claim 3, wherein the source of supply of brine and flush water has a brine valve and a flush water valve and includes an injector having the brine connection thereof with the brine valve and the water connection with the flushing valve, both of said valves being arranged to be opened during the salt wash, and the brine valve being arranged to be closed during the subsequent flushing.

In witness of the foregoing I affix my signature.

THOMAS B. CLARK.